US011326900B2

(12) United States Patent
Becker

(10) Patent No.: US 11,326,900 B2
(45) Date of Patent: May 10, 2022

(54) POSITIONING DEVICE FOR DETERMINING THE POSITION OF A TOOL SLIDE OF A MACHINE TOOL

(71) Applicant: Bogen Electronic GmbH, Berlin (DE)

(72) Inventor: Torsten Becker, Berlin (DE)

(73) Assignee: Bogen Magnetics GmbH, Berlin (DE)

( * ) Notice: Subject to any disclaimer, the term of this patent is extended or adjusted under 35 U.S.C. 154(b) by 493 days.

(21) Appl. No.: 16/009,188

(22) Filed: Jun. 14, 2018

(65) Prior Publication Data

US 2018/0306601 A1  Oct. 25, 2018

Related U.S. Application Data

(63) Continuation-in-part of application No. PCT/EP2016/081222, filed on Dec. 15, 2016.

(30) Foreign Application Priority Data

Dec. 15, 2015  (DE) .......................... 102015121812.7
Dec. 15, 2016  (WO) ................. PCT/EP2016/081222

(51) Int. Cl.
  *G01D 5/12*  (2006.01)
  *G01D 5/245*  (2006.01)
  (Continued)

(52) U.S. Cl.
  CPC ............... *G01D 5/12* (2013.01); *B23Q 3/186* (2013.01); *G01D 5/245* (2013.01); *H01F 10/08* (2013.01); *H01F 41/16* (2013.01); *Y10T 428/32* (2015.01)

(58) Field of Classification Search
  None
  See application file for complete search history.

(56) References Cited

U.S. PATENT DOCUMENTS 3,458,688 A      7/1969  Garry et al. .................. 235/61.7
3,768,094 A  *  10/1973  Henrich ............... G01D 5/2013
                                                       341/15
(Continued)

FOREIGN PATENT DOCUMENTS

AU       2009270482 B2  *  8/2013  ............. B42D 25/41
CN   WO 2015/180569          5/2015
(Continued)

OTHER PUBLICATIONS

Derwent Abstract of WO 2015-032600 A1 (Year: 2015).*
(Continued)

*Primary Examiner* — Kevin M Bernatz
(74) *Attorney, Agent, or Firm* — Imperium Patent Works; Darien K. Wallace

(57) ABSTRACT

A positioning device for a machine tool includes a substrate upon which a printing medium is deposited. The substrate has a longitudinal dimension that is longer than the transverse direction of the substrate. The printing medium includes magnetic or magnetizable particles, and the substrate is nonmagnetic. A scale is formed by first regions of the printing medium on the substrate and by second regions without the printing medium between adjacent first regions. The first regions are spaced apart in the longitudinal direction on the substrate. The printing medium is printed within the first regions on the substrate such that the printing medium is thinner in the interior of the first regions and thicker at the edges of the first regions. The location of the positioning device is determined by applying a measuring magnetic field and by detecting a resulting magnetic field emanating from a particular first region on the scale.

21 Claims, 2 Drawing Sheets

(51) Int. Cl.
  *H01F 41/16* (2006.01)
  *B23Q 3/18* (2006.01)
  *H01F 10/08* (2006.01)

(56) References Cited

U.S. PATENT DOCUMENTS

| | | | | |
|---|---|---|---|---|
| 3,878,367 | A * | 4/1975 | Fayling | G06K 19/12 |
| | | | | 360/131 |
| 4,094,804 | A | 6/1978 | Shimoiizaka | 252/62.52 |
| 4,999,623 | A * | 3/1991 | Affa | G01D 5/366 |
| | | | | 341/13 |
| 5,004,982 | A * | 4/1991 | Chaney | G01B 5/0009 |
| | | | | 324/207.22 |
| 5,543,219 | A * | 8/1996 | Elwakil | C09B 67/0004 |
| | | | | 428/402.24 |
| 5,720,012 | A | 2/1998 | McVeigh et al. | 395/113 |
| 5,793,201 | A * | 8/1998 | Nelle | G01B 7/02 |
| | | | | 324/207.14 |
| 5,927,621 | A | 7/1999 | Ziolo et al. | 241/21 |
| 6,144,300 | A * | 11/2000 | Dames | G08B 13/2462 |
| | | | | 340/572.2 |
| 7,089,678 | B2 | 8/2006 | Novak | G01D 5/2457 |
| | | | | 33/1 PT |
| 7,691,468 | B2 * | 4/2010 | Benninger | B05D 3/207 |
| | | | | 428/206 |
| 8,236,192 | B2 | 8/2012 | Breton et al. | 252/62.55 |
| 9,347,802 | B2 * | 5/2016 | Horiguchi | G01D 5/347 |
| 9,778,035 | B2 * | 10/2017 | Nagura | G01C 11/06 |
| 10,664,668 | B2 * | 5/2020 | Becker | C09D 5/00 |
| 2004/0165332 | A1 * | 8/2004 | Beson | B25B 11/002 |
| | | | | 361/144 |
| 2004/0217885 | A1 * | 11/2004 | Hudman | G01D 5/2495 |
| | | | | 341/15 |
| 2006/0150854 | A1 | 7/2006 | Benninger et al. | 101/489 |
| 2007/0060820 | A1 | 3/2007 | Lofgren et al. | 600/481 |
| 2007/0220772 | A1 * | 9/2007 | Kato | G01D 5/145 |
| | | | | 33/708 |
| 2008/0049054 | A1 * | 2/2008 | Tabata | B41J 11/42 |
| | | | | 346/74.5 |
| 2012/0225264 | A1 | 9/2012 | Villwock | 428/201 |
| 2013/0063138 | A1 * | 3/2013 | Takahashi | G01D 5/24438 |
| | | | | 324/207.25 |
| 2013/0228614 | A1 * | 9/2013 | Bergholtz | B31B 50/006 |
| | | | | 229/100 |
| 2014/0063100 | A1 | 3/2014 | Bonino et al. | 347/14 |
| 2014/0077485 | A1 | 3/2014 | Raksha et al. | B44F 1/02 |
| 2014/0306099 | A1 | 10/2014 | Oguchi et al. | G01D 5/34707 |
| 2017/0021568 | A1 * | 1/2017 | Sanz | B33Y 10/00 |
| 2019/0282142 | A1 * | 9/2019 | Fink | A61B 5/14865 |

FOREIGN PATENT DOCUMENTS

| | | |
|---|---|---|
| DE | 69838830 | 7/1997 |
| DE | 10038296 | 8/2000 |
| DE | 10038296 A1 | 8/2000 |
| DE | 10314631 | 4/2003 |
| DE | 602004013155 | 7/2003 |
| DE | 102005042895 | 9/2005 |
| DE | 102007052477 | 11/2007 |
| DE | 102008033693 | 7/2008 |
| DE | 102010041398 | 9/2010 |
| DE | 102013022028 | 12/2013 |
| EP | 0557149 | 1/1993 |
| EP | WO 2013/139969 | 3/2013 |
| EP | WO 2014/072172 | 10/2013 |
| EP | WO 2015/032600 | 8/2014 |
| GB | 878056 | 10/1957 |
| JP | S58-225316 A | 6/1982 |
| JP | 2014-116528 A | 12/2012 |

OTHER PUBLICATIONS

Office action of the Japanese Patent Office in the related Japanese patent application JP2018-532027 dated Oct. 11, 2020, as well as the English translation of the Japanese Office action (10 pages).

* cited by examiner

POSITIONING DEVICE FOR DETERMINING THE POSITION OF A TOOL SLIDE OF A MACHINE TOOL

CROSS REFERENCE TO RELATED APPLICATION

This application is filed under 35 U.S.C. § 111(a) and is based on and hereby claims priority under 35 U.S.C. § 120 and § 365(c) from International Application No. PCT/EP2016/081222, filed on Dec. 15, 2016, and published as WO 2017/102963 A1 on Jun. 22, 2017, which in turn claims priority from German Application No. 102015121812.7, filed in Germany on Dec. 15, 2015. This application is a continuation-in-part of International Application No. PCT/EP2016/081222, which is a continuation of German Application No. 102015121812.7. International Application No. PCT/EP2016/081222 is pending as of the filing date of this application, and the United States is an elected state in International Application No. PCT/EP2016/081222. This application claims the benefit under 35 U.S.C. § 119 from German Application No. 102015121812.7. The disclosure of each of the foregoing documents is incorporated herein by reference.

TECHNICAL FIELD

The invention relates to a novel positioning device for determining the position of a tool slide of a machine tool.

BACKGROUND

In machine tool engineering, it is known, for example, to use a magnetic linear scale to determine a position of a tool slide. The position can be determined with a relative measurement or an absolute measurement. For the relative position determination, a repeating bit pattern of alternating, equal-width north and south poles is measured. Because the bits of the repeating bit pattern is not distinguishable from one another, positions can only be relatively distinguished, and the position is generally ascertained by counting the number of bits that have been passed. The absolute position can be determined by indexing the bit pattern. For example, the bit pattern can be indexed by using a second track, by using the phase ratio between the tracks, or by using a distinguishable bit pattern. In the first case, the second track indexes the individual bits, and thus makes them distinguishable. In the second case, bit patterns that differ by 1 are typically used for the two tracks. In the third case, distinguishable bit patterns are used in which the individual scale increment distances have different widths, for example their magnitudes increase from an absolute starting point. In the presence of a powerful magnetic field, however, every second bit may possibly be reversely magnetized. As a result, all of the bits can adopt the same polarity so that the position can no longer be determined.

Therefore, a method is sought for determining the position of a positioning device by reading the position of the device without error even in the presence of powerful magnetic fields.

SUMMARY

The invention relates to an object having a substrate and a scale that is applied to the substrate. The scale is formed using a printing medium that contains magnetizable and/or magnetic particles and that has regions with the printing medium as well as regions without the printing medium. The object is designed to indicate positions using the regions with the printing medium and the regions without the printing medium. The magnetic properties of the substrate are such that when an external magnetic field is applied to the object or when the magnetic field of the magnetic particles is read, a stronger magnetic field is generated from the printing medium than from the substrate.

A positioning device for a machine tool includes a substrate upon which a printing medium is deposited that forms a scale. The substrate has a longitudinal dimension that is longer than the transverse dimension of the substrate. The printing medium includes magnetic or magnetizable particles. The substrate is a nonmagnetic substance, such as aluminum. The scale is formed by first regions of the printing medium on the substrate and by second regions without the printing medium that are dispose between adjacent first regions. The first regions are spaced apart in the longitudinal direction on the substrate. The printing medium is printed within the first regions on the substrate such that the printing medium is thinner in the interior of the first regions and is thicker at the edges of the first regions. The printing medium is adapted to produce a stronger magnetic field from the first regions than from the second regions when a measuring external magnetic field is applied to a measurement location on the scale of the positioning device.

The printing medium includes the magnetic or magnetizable particles in a concentration of 40% to 70% by volume. Examples of the magnetic particles are hard magnetic particles, pigment particles, micromagnet particles, and particles of rare earth metals. Examples of magnetizable parties are pigments, ceramic particles and rare earth metals. The magnetic particles have an average longest dimension that is less than 2 µm. The printing medium can also include a dye that imparts a color to the printing medium that can be optically read. The first regions form a plurality of scale marks that are distributed over the top surface of the substrate at a spacing that is linear, quadratic or logarithmic. Each of the scale marks has a common width that is 10 µm to 100 µm. Alternatively, the first regions form a plurality of characters that are either letters or numbers.

A method of making a positioning device for a machine tool involves depositing a printing medium on a substrate and magnetizing the printing medium after it has been deposited. The printing medium includes magnetizable particles that comprise 40% to 70% of the printing medium by volume. The printing medium is deposited within first regions that are spaced apart across a longitudinal dimension of the substrate. The longitudinal dimension is longer than the transverse dimension of the substrate. The printing medium is deposited within the first regions by offset printing, laser printing or inkjet printing. The first regions form a plurality of scale marks that are distributed over the top surface of the substrate in a pattern with a linear, quadratic or logarithmic spacing.

Each of the first regions has an interior and edges. No printing medium is deposited in second regions on the substrate that are disposed between the first regions. The printing medium is deposited such that the printing medium is thinner in the interior of the first regions and is thicker at the edges of the first regions. The printing medium is magnetized by applying a magnetizing external magnetic field to the printing medium after the printing medium has been deposited. The printing medium is magnetized such that when a measuring external magnetic field is applied over the substrate, a stronger magnetic field can be detected emanating from the first regions than from the second regions. The printing medium is sufficiently thinner in the interior of the first regions than at the edges of the first regions such that the magnetic field emanating from the first regions has a gradient at the edges of the first regions that is measurably greater than the gradient at the edges of the first regions had the printing medium been deposited at a uniform thickness within the first regions.

A method of determining the position of a positioning device of a machine tool involves applying a measuring external magnetic field to a measurement location on a scale of the positioning device. The positioning device includes a substrate over which a printing medium has been deposited at first regions to form the scale. Each of the first regions has a common width of 1 µm to 100 µm in the longitudinal dimension of the positioning device. The first regions are spaced apart across the longitudinal dimension over the substrate. The magnetic field emanating from the measurement location is detected when the measuring magnetic field is applied. The position of the positioning device is determined based on the detected magnetic field emanating from the measurement location, which is located at a particular first region on the scale.

In one embodiment, the detecting of the magnetic field emanating from the measurement location detects an angle of inclination of a particular first region disposed at the measurement location. The angle of inclination is the angle between an edge of the particular first region and the transverse dimension. The detected angle of inclination identifies the particular first region and thereby the position of the measurement location on the positioning device.

Other embodiments and advantages are described in the detailed description below. This summary does not purport to define the invention. The invention is defined by the claims.

BRIEF DESCRIPTION OF THE DRAWING

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
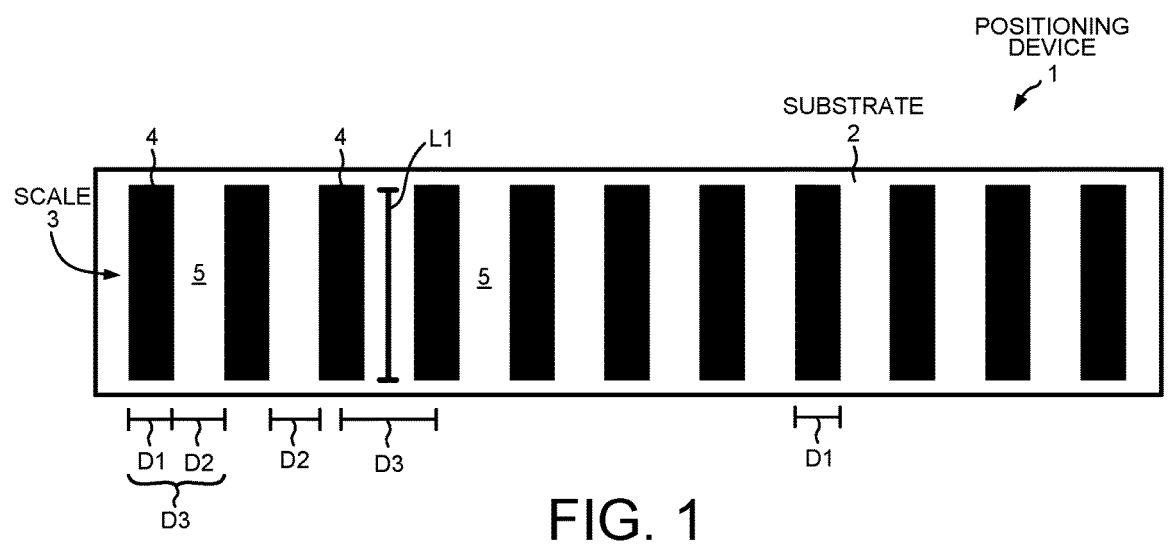
FIG. 1 shows a first embodiment of the positioning device that has a scale with scale marks of equal lengths.

FIG. 1 shows a novel positioning device 1 that includes a substrate 2 and a scale 3. The scale 3 is printed onto the substrate 2 using a printing medium that includes magnetizable or magnetic particles. The scale 3 includes first regions 4 with the printing medium and second regions 5 that are located between the first regions and that are free of the printing medium. Thus, the scale 3 has regions 4 containing the printing medium and regions 5 that have no printing medium. The scale 3 is used to indicate the position by means of the first regions 4 that have the printing medium and the second regions 5 that are free of the printing medium. The magnetic properties of the substrate 2 are such that when a measuring external magnetic field is applied to the positioning device 1 or when the magnetic field of the magnetic particles is read, a stronger magnetic field is generated from the printing medium than from the substrate 2.

A method is disclosed for making the novel positioning device 1. The method involves providing the substrate 2, applying the scale 3 to the substrate 2 using a printing medium that contains magnetizable and/or magnetic particles. The scale 3 has regions that have the printing medium and regions without the printing medium, which are positioned between the regions with the printing medium. The scale 3 is designed to indicate the position of the positioning device 1 using the regions that have the printing medium and the regions that are free of the printing medium. The magnetic properties of the substrate 2 are such that when an external magnetic field is applied to the positioning device 1 or when the magnetic field of the magnetic particles is read, a stronger magnetic field is generated from the printing medium than from the substrate.

A method is disclosed for determining the position of the positioning device 1. The method involves detecting whether a magnetic field is present and emanating from a measurement location on the positioning device 1. The measurement location is disposed in the region of the scale 3 on the positioning device 1. The position of the positioning device 1 is determined based on either (i) the detected or undetected magnetic fields emanating from the measurement location, or (ii) the shape of the magnetic fields emanating from the measurement location. The novel positioning device 1 allows the position of the positioning device 1 to be read without error, even in the presence of strong, interfering magnetic fields. In addition, smaller structures used for positioning can be produced with the printing medium than with a conventional bit pattern. Consequently, the position of the novel positioning device 1 can be determined with greater precision than if a conventional bit pattern were used. Moreover, the novel positioning device 1 can be produced less expensively than can a conventional bit pattern.

The magnetic properties of the substrate 2 of the novel positioning device 1 are such that the substrate 2 is substantially not magnetic and substantially not magnetizable. As a result, at the transition from the regions 4 that have the printing medium to the regions 5 that are free of the printing medium, particularly large gradients of the magnetic field are generated. Through the large gradients in the magnetic field, the regions that have the printing medium and their position can be determined in an error-free manner and with a high degree of precision. Consequently, the position of the positioning device 1 can be determined with a high degree of precision.

The scale 3 of the novel positioning device 1 has a plurality of scale marks or characters, such as letters or numbers, that comprise an amount of the printing medium. By using scale marks 4, it is possible to determine the relative position of the positioning device 1 by counting the scale marks. By using scale marks 4 that have different lengths and/or widths, the absolute position of the novel positioning device 1 can be determined by identifying the length and/or width. The absolute position of the novel positioning device 1 can be determined using a plurality of tracks of scale marks. Alternatively, the absolute position of the novel positioning device 1 can be determined using characters as opposed to scale marks. In one embodiment, one of the scale marks 4 is tagged with a label 6 that is applied to the substrate 2 using the printing medium. The label 6 is used to determine the absolute position of the tagged scale mark 4.

The scale 3 of the novel positioning device 1 can be divided linearly, quadratically or logarithmically, or the scale 3 can be composed of a pattern of identification stripes 12. The pattern of identification stripes 12 can be based on the degree to which adjacent stripes are not parallel to one another.

The identification stripes 12 are applied to the substrate 2 using the printing medium. The distance from a first identification stripe to an adjacent second identification stripe is the distance from a first position 9 of the scale 3 and a second position 10 spaced apart from the first position in the longitudinal direction 11 of the scale 3. Each identification stripe 12 is inclined at a respective angle of inclination 8 relative to the transverse direction 13 in a predetermined manner such that each of the angles of inclination 8 has a value that differs from the values of the other angles of inclination. The identification stripes 12 on the scale 3 are regularly divided so that the scale 3 can indicate the position. Because of the irregular structure of a barcode or a two-dimensional QR code (Quick Response Code), for example, those codes cannot be used to identify position. The different angles of inclination 8 of the identification stripes 12, however, make it possible to determine easily the absolute position of the novel positioning device 1 by determining the angle of inclination 8 of the identification stripe 12 at the measurement location.

The scale marks 4 preferably have a width of 1 µm to 1 mm, in particular from 10 µm to 100 µm, or from 1 µm to 10 µm. The position of the positioning device 1 can be established with a higher degree of precision the smaller the width of the scale marks 4. Scale marks 4 with the aforementioned widths can easily be produced using the printing medium.

The printing medium contains pigments that include the magnetizable and/or magnetic particles. The printing medium may also contain a dye. This allows the scale 3 to be read not only magnetically, but also optically. For cost reasons, it is particularly advantageous to use pigments that already contain magnetizable and/or magnetic particles because this obviates the need to add the magnetizable particles to the dye and/or the pigments.

The printing medium preferably has a filling degree of 30% to 90% by volume, in particular 40% to 70% by volume, of the magnetizable and/or magnetic particles. In addition, the printing medium contains a binding agent and optionally also a solvent. The binding agent ensures that the printing medium adheres to the positioning device. The solvent can be provided in order to dissolve the dye. The percentage of 30% to 90% by volume of magnetizable and/or magnetic particles achieves a high magnetizability of the pattern with a simultaneously strong adhesion. A filling degree of about 50% by volume is preferable in this regard.

The magnetizable particles include pigments, ceramic particles and/or rare earth metals. The magnetic particles include hard magnetic particles, pigments, micromagnets, ceramic particles and/or rare earth metals. Hard magnetic particles are advantageous because they have strong magnetic field strengths. Pigments are advantageous because they function both as a magnet and as a colorant. Ceramic metals are advantageous due to their chemical resistance. Rare earth metals have high magnetic field strengths.

The average size of the magnetizable and/or magnetic particles is preferably less than 2 µm (microns). If the magnetizable particles are spherical, then the size indicates the particle diameter. If the form of the magnetizable particles is other than spherical, then the size is the longest dimension occurring in the magnetizable particle. The method for determining the position of the positioning device 1 in an external magnetic field uses magnetizable and/or magnetic particles having a small size so that the particles are particularly easy to align magnetically. The particles are easy to align particularly when they are hard magnetic particles that are already in a magnetized state. This permits a particularly strong magnetization to be achieved in the regions that have the printing medium.

The printing medium is formed in such a way that the middle region of the printing medium is concave and so that the printing medium is raised in its edge regions. Consequently, when a measuring external magnetic field is applied to the positioning device, the magnetic field emanating from the printing medium has a high gradient at the transition from the regions 4 with the printing medium to the regions 5 without the printing medium. The high gradient of the magnetic field allows the position to be determined in a particularly precise way. The printing medium is applied to the substrate 2 by means of printing. Conceivable options for this include offset printing, laser printing and/or inkjet printing.

The method for producing the novel positioning device 1 involves magnetizing the scale 3 during and/or after the scale 3 is applied using a magnetizing external magnetic field. In this connection, the magnetization of the scale 3 preferably takes place before the binding agent of the printing medium is cured. This is particularly suitable for hard magnetic particles that are already in the magnetized state in the printing medium. The orientation that is imparted to the particles by the magnetization is frozen in place when the binding agent cures.

In order to prevent the agglomeration of the magnetizable and/or magnetic particles before the scale 3 is printed on the substrate 2, the printing medium can be stirred. Alternatively, a sieve can be provided in a flow of the printing medium, whose mesh openings are dimensioned so that individual magnetizable and/or magnetic particles can penetrate the sieve, but agglomerates or clumps of particles are retained by the sieve.

The method of producing the novel positioning device 1 includes forming the printing medium during and/or after it is applied to the substrate 2 in such a way that the middle region of the applied printing medium is concave and so that the printing medium is raised at its edge regions. When an external magnetic field is applied to the novel positioning device 1, the concave middle region and raised edges of the printing medium cause the magnetic field emanating from the printing medium to have a higher gradient at the transition from the regions 4 with the printing medium to the regions 5 without the printing medium. These high gradient in the magnetic field are not present before the regions of the printing medium are formed on the substrate 2. It is thus possible to increase the precision by which the position of the positioning device 1 is determined.

The method for determining the position of the novel positioning device 1 involves applying an external magnetic field to a measurement location on the positioning device 1 such that the scale 3 is magnetizable. The magnetic field emanating from the measurement location is detected using the inductive effect and/or the magnetoresistance effect. For example, the following magnetoresistance effects can be used: the anisotropic magnetoresistance effect, the giant magnetoresistance effect, the magnetic tunnel resistance effect and/or the Hall effect. By using the giant magnetoresistance effect and the magnetic tunnel resistance effect, it is possible to read particularly small regions to which the printing medium has been applied, which enables a particularly precise position determination.

FIGS. 1-4 illustrate the novel positioning device 1 that includes the substrate 2 and the scale 3. In one embodiment, the substrate 2 is aluminum. The scale 3 is applied to the substrate 2 using a printing medium that includes magnetizable and/or magnetic particles. The scale 3 includes the regions 4 that have the printing medium and the regions 5 that are free of the printing medium.

The scale 3 is used to indicate a plurality of positions by means of the regions 4 with the printing medium and the regions 5 without the printing medium. The magnetic properties of the substrate 2 are such that when an external magnetic field is applied to the positioning device 1 and when the magnetic field of the magnetic particles from the printing medium is read, a stronger magnetic field is generated from the regions 4 than from the substrate 2. In order to achieve this, the magnetic properties of the substrate 2 can be such that the substrate 2 is substantially not magnetic and substantially not magnetizable. For example, the substrate 2 can be made of aluminum.

The printing medium can include pigments that in particular contain the magnetizable and/or magnetic particles. The printing medium can also include a dye. Furthermore, the printing medium can have a filling degree of the magnetizable and/or magnetic particles of 30% to 90% by volume, in particular 40% to 70% by volume. The magnetizable particles can be pigments, ceramic particles and/or rare earth metals. The magnetic particles can be hard magnetic particles, pigments, micromagnets, ceramic particles and/or rare earth metals. An average of the size distribution of the magnetizable and/or magnetic particles is less than 2 μm. If the magnetizable particles are spherical, then the size indicates the particle diameter. If the form of the magnetizable particles is other than spherical, then the size is the longest dimension occurring in the magnetizable particle.

Figure 2:
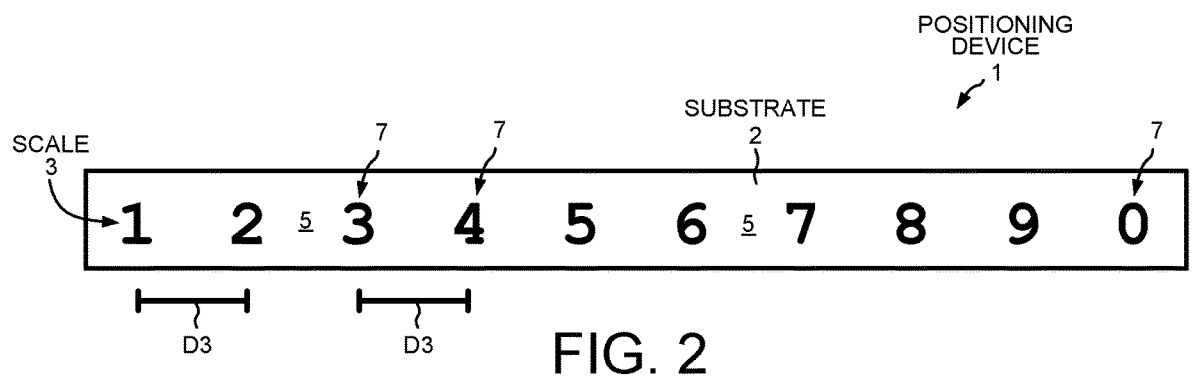
FIG. 2 shows a second embodiment of the positioning device that has a scale with numbers.
Figure 3:
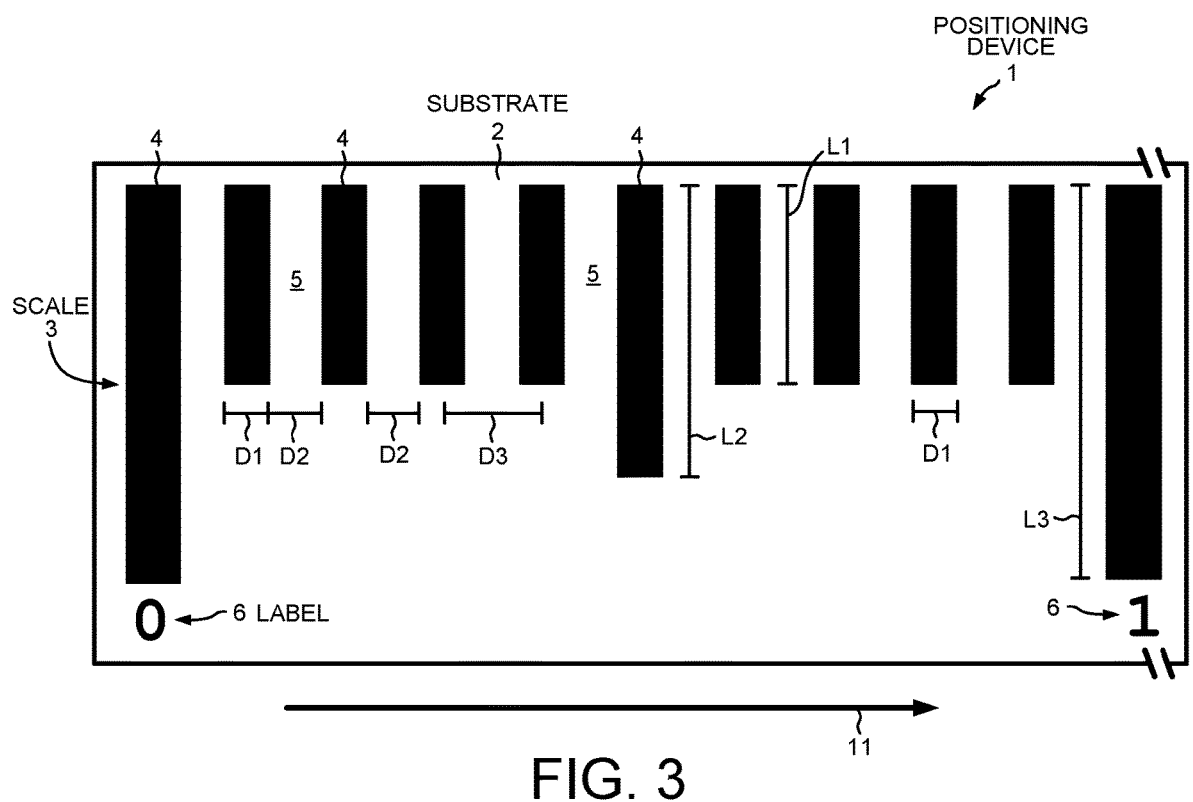
FIG. 3 shows a third embodiment of the positioning device that has a scale with scale marks of different lengths.

The scales 3 of the three embodiments of FIGS. 1-3 are linearly divided scales. Quadratically divided or logarithmically divided scales are also conceivable. Nonius measuring systems and systems with varying angles of inclination are also conceivable. By contrast, it is not possible to identify the position of a substrate using a barcode or QR code due to the irregular structure of the barcode or QR code. The scale 3 of the first embodiment of FIG. 1 has a plurality of scale marks 4 that are applied to the substrate 2 using the printing medium and that constitute the regions 4 that have the printing medium. In this embodiment, all of the scale marks 4 have the same length L1 and the same width D1. The width of each region 5 between each adjacent pair of scale marks 4, which is free of the printing medium, is D2. The scale 3 of the first embodiment is thus linearly divided. The increment distance D3 of this scale is D3=D1+D2.

FIG. 2 shows a second embodiment of the novel positioning device 1 that includes a scale 3 comprising a plurality of numbers 7. The plurality of numbers 7 are applied to the substrate 2 using the printing medium and constitute the regions 4 that have the printing medium. The numbers 7 are arranged in ascending order. Between each adjacent pair of numbers 7 is a region 5 that is free of the printing medium. The increment distance D3 of this scale is the same for each pair of adjacent numbers. The scale 3 of the second embodiment is thus also linearly divided. The increment distance D3 can, for example, be the distance between the centers of two adjacent numbers.

FIG. 3 shows a third embodiment of the novel positioning device 1 that includes a scale 3 comprising a plurality of scale marks 4 that are applied to the substrate 2 using the printing medium and that constitute the regions that have the printing medium. In this embodiment, all of the scale marks 4 have the same width D1. The width of the region 5, which is free of the printing medium between two adjacent scale marks 4, is D2 and is likewise equal between each pair of adjacent scale marks 4. The scale 3 of the third embodiment is thus also linearly divided. The increment distance D3 of this scale is D3=D1+D2. The scale 3 of the third embodiment has scale marks 4 with the length L1, scale marks 4 with the length L2, and scale marks 4 with the length L3, where L3>L2>L1. The scale 3 is formed in such a way that each tenth scale mark 4 has the length L3. In the longitudinal direction 11, the scale 3 has one scale mark 4 of length L3, four scale marks 4 of the length L1, one scale mark 4 of the length L2, and four scale marks 4 of the length L1.

Figure 4:
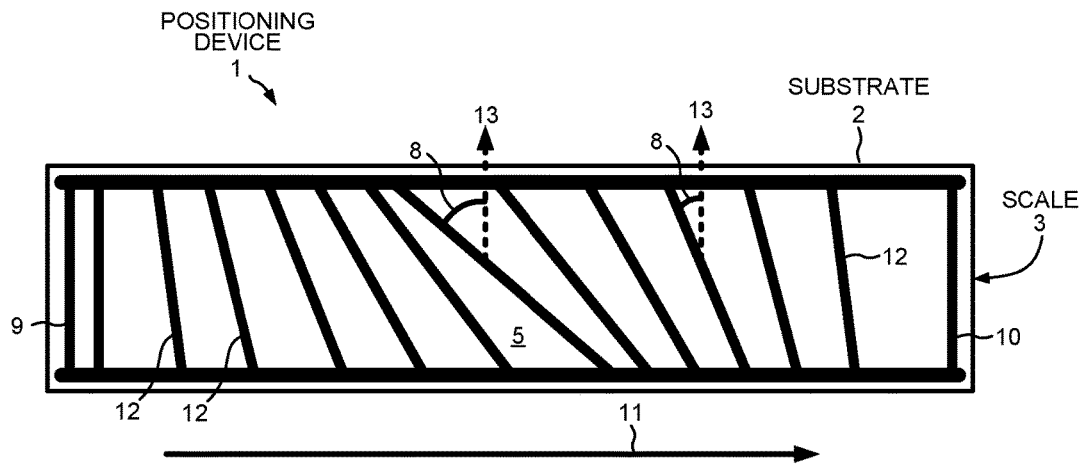
FIG. 4 shows a fourth embodiment of the positioning device that has a scale with identification stripes that have different angles of inclination.

FIG. 4 shows a fourth embodiment of the novel positioning device 1 that forms a pattern that is composed of identification stripes 12 applied to the substrate 2 using the printing medium. The plurality of identification stripes 12 are disposed between a first position 9 of the scale 3 and a second position 10 on the opposite side of the scale 3 in the longitudinal direction 11.

Each of the identification stripes 12 is inclined at an angle of inclination 8 relative to the transverse direction 13 in a predetermined way such that each of the angles of inclination 8 has a value that differs from the values of the other angles of inclination 8. If a quadratically divided scale or a logarithmically divided scale is used, then the increment distance between identification stripes 12 changes in the longitudinal direction 11 of the scale 3.

The method for producing the positioning device 1 of the four embodiments involves providing the substrate 2 and applying the scale 3 to the substrate 2 by using a printing medium that contains magnetizable and/or magnetic particles. The printing medium can be applied to the substrate 2 using offset printing, laser printing and/or inkjet printing.

The method for producing the positioning device 1 also includes the step of forming the printing medium during and/or after its application to the substrate 2 in such a way that the interior region of the printing medium is concave and so that the printing medium is raised in its edge regions. When an external magnetic field is applied to the positioning device 1, the magnetic field emanating from the printing medium has a higher gradient at the transition from the regions 4 with the printing medium to the regions 5 without the printing medium than exists on the substrate 2 before the printing medium is applied.

For each of the four embodiments, a method of determining the position of the positioning device 1 involves applying an external magnetic field to a measurement location on the positioning device 1. The measurement location is located in the region of the scale 3 such that the scale 3 is magnetizable. The method detects whether a magnetic field emanates from the measurement location.

The position of the positioning device 1 is determined either based on the detected or undetected magnetic field emanating from the measurement location or based on the shape of the magnetic field emanating from the measurement location. The presence or the shape of the magnetic field is detected using the inductive effect and/or the magnetoresistance effect. Where the magnetic field is detected using the magnetoresistance effect, the magnetic field is measured using the anisotropic magnetoresistance effect, the giant magnetoresistance effect, the magnetic tunnel resistance effect or the Hall effect.

REFERENCE NUMERALS 1 positioning device
2 substrate
3 scale
4 scale mark
5 region that is free of the printing medium
6 label
7 number
8 angle of inclination
9 first position
10 second position
11 longitudinal direction
12 identification stripe
13 transverse direction
D1 width of the scale marks
D2 width of the region without the printing medium
D3 increment distance
L1 length of the scale mark
L2 length of the scale mark
L3 length of the scale mark Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. An object, comprising:
a substrate with a top surface, a longitudinal direction and a transverse direction, wherein the longitudinal direction is longer than the transverse direction, wherein the top surface is planar, wherein the substrate is aluminum, and wherein the substrate is nonmagnetic; and
a scale that includes first regions having a printing medium on the top surface of the substrate and second regions of the top surface of the substrate having no printing medium, wherein the first regions are spaced apart in the longitudinal direction over the top surface, wherein the printing medium includes magnetic particles, wherein no magnetic particles are present in the second regions, wherein each of the first regions has an interior and edges, wherein the printing medium is thinner in the interior of the first regions and is thicker at the edges of the first regions, and wherein when an external magnetic field is applied to the object or when a magnetic field emanating from the magnetic particles is read, a stronger magnetic field emanates from the printing medium than from the substrate.

2. The object of claim 1, wherein the object is a positioning device.

3. The object of claim 1, wherein the first regions are rectangular and elongated in the transverse direction.

4. A positioning device, comprising:
a substrate with a top surface, a longitudinal direction and a transverse direction, wherein the longitudinal direction is longer than the transverse direction, wherein the top surface is planar, and wherein the substrate is nonmagnetic; and
a scale that includes first regions having a printing medium on the top surface of the substrate and second regions of the top surface of the substrate having no printing medium, wherein the first regions are spaced apart in the longitudinal direction over the top surface, wherein the printing medium includes magnetic particles, wherein the printing medium is thinner in an interior and thicker at edges of each of the first regions, and wherein no magnetic particles are present in the second regions.

5. The positioning device of claim 4, wherein the printing medium is applied to the top surface by a printing process selected from the group consisting of: offset printing, laser printing and inkjet printing.

6. A positioning device, comprising:
a substrate with a top surface, a longitudinal direction and a transverse direction, wherein the longitudinal direction is longer than the transverse direction, wherein the top surface is planar, and wherein the substrate is nonmagnetic; and
a scale that includes first regions having a printing medium on the top surface of the substrate and second regions of the top surface of the substrate having no printing medium, wherein the first regions are spaced apart in the longitudinal direction over the top surface, wherein the printing medium includes magnetic particles, wherein no magnetic particles are present in the second regions, and wherein at least two of the first regions have lengths in the transverse direction that are not equal.

7. A positioning device, comprising:
a substrate with a top surface, a longitudinal direction and a transverse direction, wherein the longitudinal direction is longer than the transverse direction, and wherein the substrate is nonmagnetic; and
a scale that includes first regions having a printing medium on the top surface of the substrate and second regions of the top surface of the substrate having no printing medium, wherein the first regions are spaced apart in the longitudinal direction over the top surface, wherein the printing medium includes magnetic particles, wherein each of the first regions has an interior and edges, and wherein the printing medium is printed within the first regions on the top surface of the substrate such that the printing medium is thinner in the interior of the first regions and is thicker at the edges of the first regions.

8. The positioning device of claim 4, wherein the printing medium is adapted to produce a stronger magnetic field from the first regions than from the second regions when a measuring external magnetic field is applied to the positioning device.

9. The positioning device of claim 4, wherein the first regions form a plurality of scale marks that are distributed over the top surface of the substrate at a spacing that is quadratic or logarithmic.

10. The positioning device of claim 4, wherein the first regions form a plurality of scale marks, and wherein each of the plurality of scale marks has a common width that is 10 μm to 100 μm.

11. The positioning device of claim 4, wherein the first regions form a plurality of characters, and wherein the plurality of characters are letters or numbers.

12. The positioning device of claim 4, wherein the printing medium includes the magnetic particles in a concentration of 40% to 70% by volume.

13. The positioning device of claim 4, wherein the magnetic particles have an average longest dimension that is less than 2 μm.

14. The positioning device of claim 4, wherein the printing medium includes a dye that imparts a color to the printing medium that can be optically read.

15. The positioning device of claim 4, wherein the substrate is aluminum.

16. A method comprising:
depositing a printing medium within first regions that are spaced apart across a longitudinal dimension over a top surface of a substrate, wherein the longitudinal dimension is longer than a transverse dimension of the substrate, wherein no printing medium is deposited in second regions on the top surface of the substrate that are disposed between the first regions, wherein each of the first regions has an interior and edges, and wherein the printing medium is deposited such that the printing medium is thinner in the interior of the first regions and is thicker at the edges of the first regions; and magnetizing the printing medium after the depositing of the printing medium, wherein the printing medium includes magnetizable particles, and wherein the printing medium is magnetized such that when a measuring external magnetic field is applied over the substrate, a stronger magnetic field can be detected emanating from the first regions than from the second regions.

17. The method of claim 16, wherein the printing medium is sufficiently thinner in the interior of the first regions than at the edges of the first regions such that the magnetic field emanating from the first regions has a gradient at the edges of the first regions that is measurably greater than the gradient at the edges of the first regions had the printing medium been deposited within the first regions at a uniform thickness.

18. The method of claim 16, wherein the printing medium is deposited within the first regions by offset printing, laser printing or inkjet printing.

19. The method of claim 16, wherein the first regions form a plurality of scale marks that are distributed over the top surface of the substrate in a pattern with a linear, quadratic or logarithmic spacing.

20. The method of claim 16, wherein the printing medium is magnetized by applying a magnetizing external magnetic field to the printing medium deposited on the top surface of the substrate.

21. The method of claim 16, wherein the stronger magnetic field is detected emanating from the first regions using a magnetoresistance effect taken from the group consisting of: an anisotropic magnetoresistance effect, a giant magnetoresistance effect, a magnetic tunnel resistance effect and a Hall effect.

\* \* \* \* \*